United States Patent [19]

Farnsworth et al.

[11] Patent Number: 4,612,610

[45] Date of Patent: Sep. 16, 1986

[54] POWER SUPPLY CIRCUIT UTILIZING TRANSFORMER WINDING VOLTAGE INTEGRATION FOR INDIRECT PRIMARY CURRENT SENSING

[75] Inventors: Robert P. Farnsworth; John J. Nesler, both of Los Angeles, Calif.

[73] Assignee: Hughes Aircraft Company, Los Angeles, Calif.

[21] Appl. No.: 586,591

[22] Filed: Mar. 6, 1984

[51] Int. Cl.⁴ .......................................... H02M 3/335
[52] U.S. Cl. ......................................... 363/26; 363/19
[58] Field of Search ....................... 363/19, 26, 56, 97, 363/134, 37, 17, 41, 98; 323/285; 364/162, 180; 318/610

[56] References Cited

U.S. PATENT DOCUMENTS

| | | | |
|---|---|---|---|
| 3,614,587 | 10/1971 | Schwarz | 363/26 |
| 3,784,893 | 1/1974 | Rando | 363/28 |
| 4,071,884 | 1/1978 | Maigret | 363/21 |
| 4,146,832 | 3/1979 | McConnell | 323/285 |
| 4,172,277 | 10/1979 | Pinson | 363/21 |
| 4,272,805 | 6/1981 | Iguchi et al. | 363/19 |
| 4,390,942 | 6/1983 | de Keizer | 364/162 |
| 4,422,032 | 12/1983 | Kakumoto et al. | 363/37 |
| 4,541,040 | 9/1985 | Allfather | 363/98 |

Primary Examiner—Patrick R. Salce
Assistant Examiner—D. L. Rebsch
Attorney, Agent, or Firm—Ronald L. Taylor; A. W. Karambelas

[57] ABSTRACT

In a power supply having transformer coupling for regulation of voltage by a pulsing of primary current, a control circuit integrates the output voltage to obtain a measure of flux and primary current. A comparator monitors the integrated voltage to terminate a pulse of primary current prior to saturation of a core of the transformer. This insures linear operation and efficient transfer of energy from the primary to the secondary windings of the transformer. A sensor of secondary current initiates a new pulse of primary current when the secondary current has decayed to a fractional value of the peak secondary current.

9 Claims, 2 Drawing Figures

4,612,610

POWER SUPPLY CIRCUIT UTILIZING TRANSFORMER WINDING VOLTAGE INTEGRATION FOR INDIRECT PRIMARY CURRENT SENSING

The Government of the United States of America has rights in the invention pursuant to Contract No. DAAK40-77-C-0097 awarded by the Department of the Army.

BACKGROUND OF THE INVENTION

This invention relates to electric power supplies and, more particularly, to power supplies having the form of a flyback switching regulator including a transformer, wherein drive control is attained by sensing an electrical parameter proportional to magnetic energy stored in the transformer.

Power supplies are constructed in numerous configurations of electrical circuits. One form of supply, useful in converting electric energy at an unregulated low voltage to electric energy at a relatively high regulated voltage suitable for charging a pulse forming network, employs a transformer in a flyback switching regulator. Circuitry at the primary winding of the transformer generates a pulse of electric voltage across the primary winding of such a polarity to reverse bias diodes connecting the transformer secondary to the pulse forming network. The current in the primary winding increases linearly with time, and is then abruptly terminated. The objective is often to terminate the primary voltage when a certain peak current has been attained. Upon termination of the primary current, the polarity of the voltage at the secondary winding causes the diodes to be forward biased connecting the secondary to the pulse forming network whereby the energy is transferred from the primary winding through the secondary winding to the load circuitry associated therewith. The pulse of energy is generally stored in a capacitor of the secondary-winding circuit for later use in applying power to an external load such as a flashlamp.

The operation of the supply continues in a repetitive fashion in which a succession of pulses of electromagnetic energy are coupled from the primary circuit of the transformer through the secondary circuit of the transformer to the load capacitor until the desired high voltage charge is obtained. The high pulse repetition frequency reduces the rate at which current is drawn by the load capacitor compared to what current would be drawn from other types of power supplies of equivalent output voltage. This permits lower peak currents to be drawn from a lower source voltage than direct charging would allow. The supply functions as a regulator by varying the pattern of pulse-width modulation to compensate for changes in input voltage and associated output voltage rise as the capacitor charges in the load circuit.

In particular, it is noted that a critical part of the regulation process relates to a determination of the status of the stored energy in the transformer. The termination of a pulse of energy to the primary is controlled according to the sensed level of energy in the transformer to prevent transformer saturation. The generation of a new pulse does not begin until a significant portion of the energy of the previous pulse has been coupled through the secondary circuit to the load circuit capacitor. Conversely, if the generation of the new pulse is delayed excessively from the previous pulse, the power output capacity may be reduced.

One form of control has employed circuitry for sensing the amplitude of current flowing in the primary circuit of the transformer. This has proven to be disadvantageous in that a current sensing resistor must be serially connected to the primary winding; also, a current sensing transformer might also be employed.

By way of example in the construction of power supplies, the following United States patents are of interest. Switching regulator power supplies are disclosed in U.S. Pat. Nos. 4,135,234; 4,180,852; 4,209,826; and 4,233,557. A saturable reactor power supply is disclosed in U.S. Pat. Nos. 4,135,234 and 3,590,362. A frequency controlled inverter power supply is disclosed in U.S. Pat. No. 3,818,314. Regulated power supplies incorporating resonance circuits are disclosed in U.S. Pat. Nos. 3,519,741; 4,030,025; 3,875,493; and 4,156,175. Current sensing in a power supply is disclosed in U.S. Pat. No. 3,663,949.

A problem exists in that both of the foregoing sensing elements present difficulties in a manufacturing operation because both are difficult to procure and to specify. For example, the current sensing resistor must be of an unusually low value of resistance, and often must have a high power rating. Low resistance reduces power dissipation but also results in millivolt levels of voltage which make the control circuit unduly sensitive to noise. In the case of the current sensing transformer, the characteristics may vary among manufacturers resulting in a loss in accuracy of control of the supply.

SUMMARY OF THE INVENTION

The foregoing problems are overcome and other advantages are provided by a transformer-coupled flyback switching regulator power supply incorporating circuitry of the invention which control operation of the supply by measurement of secondary voltage to determine the magnitude of primary current in the transformer. Thereby, the amount of primary current and energy stored in the primary winding can be controlled to ensure that the transformer core does not saturate and that the transformer operates in a linear mode. This form of control is attained without breaking into the primary circuit with current sensing equipment.

In accordance with the invention, an input pulse of unregulated voltage is applied to the primary winding of the transformer. The output voltage of a secondary winding of the transformer, or of a predetermined fraction thereof obtained by a tapped winding or auxiliary winding, is integrated with respect to time to obtain the value of flux and current building up in the primary winding in response to the input voltage pulse. A suitable integrator is formed by use of a capacitor charged through a resistor. A comparator compares the output signal of the integrator with a reference signal to terminate the input pulse when the desired level of primary current has been reached. Upon termination of the input voltage pulse, this being done by essentially opening the primary winding, the primary current ceases abruptly and the flyback current appears in the secondary winding. This operation is a highly efficient transfer of energy from the primary winding circuit to the secondary winding circuit.

The flyback current is in the form of a current pulse which begins abruptly and is fed to a storage capacitor coupled to the secondary winding. As the energy of the current pulse builds up in the capacitor, the flyback current decays toward zero. A small resistor is placed in the secondary circuit, in parallel with the diode, to sense the decay in flyback current. A comparator compares the value of the decaying current with a reference signal to initiate another input voltage pulse to the primary winding when the flyback current has decayed to a predetermined fraction of its initial value, typically 25% of the initial value. In this way, the average power transfer, through the transformer over a succession of pulses can be maximized, since the pulse repetition frequency is varied in accordance with rate of decay in the flyback current, such decay rate also being a measure of the rate of transfer of a pulse of energy into the storage capacitor.

Additional voltage sensing circuitry is employed to terminate the succession of input pulses when the storage capacitor is fully charged. Also, as a further logic function, the foregoing flux sensing comparator is provided with hysteresis so as to avoid premature restart of an input pulse as the integrator output signal begins to drop. Thereby, the initialization of the input voltage pulses is accomplished solely in response to operation of the current sensing compartor.

BRIEF DESCRIPTION OF THE DRAWINGS

The aforementioned aspects and other features of the invention are explained in the following description, taken in connection with the accompanying drawings wherein.

DETAILED DESCRIPTION

Figure 1:
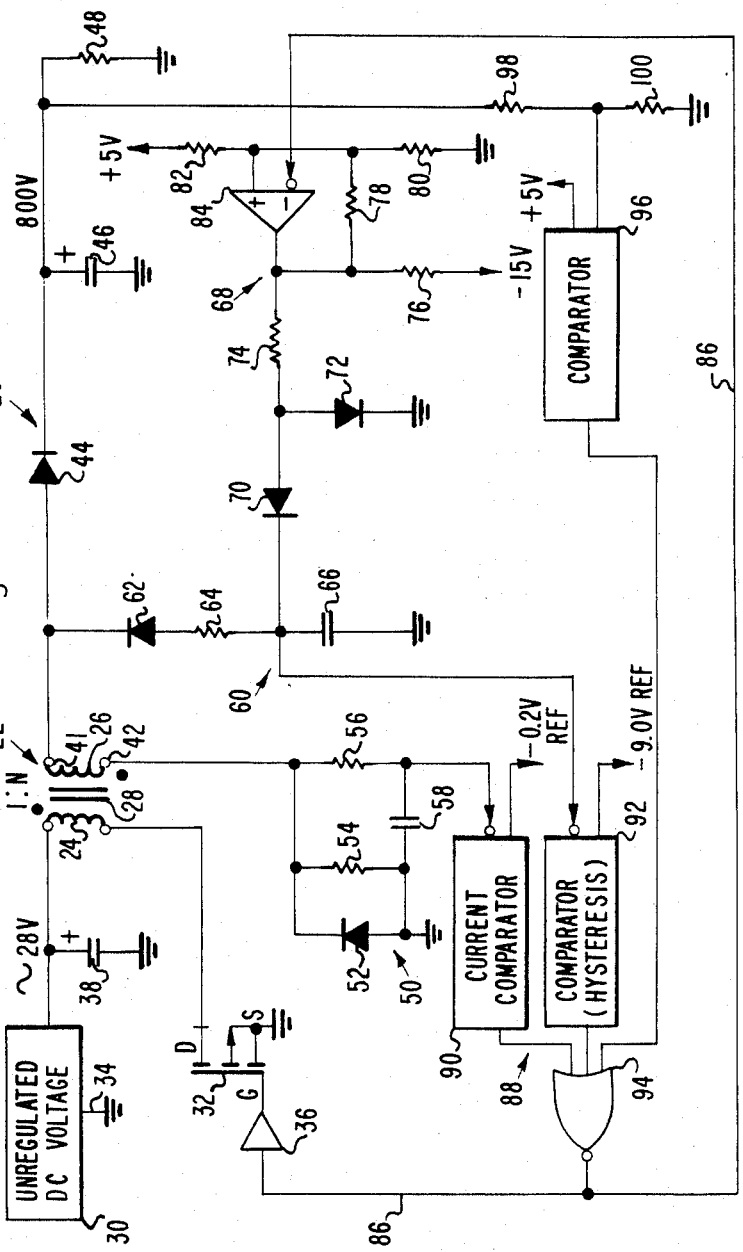
FIG. 1 is an electrical schematic diagram of a power supply incorporating the invention.
Figure 2:
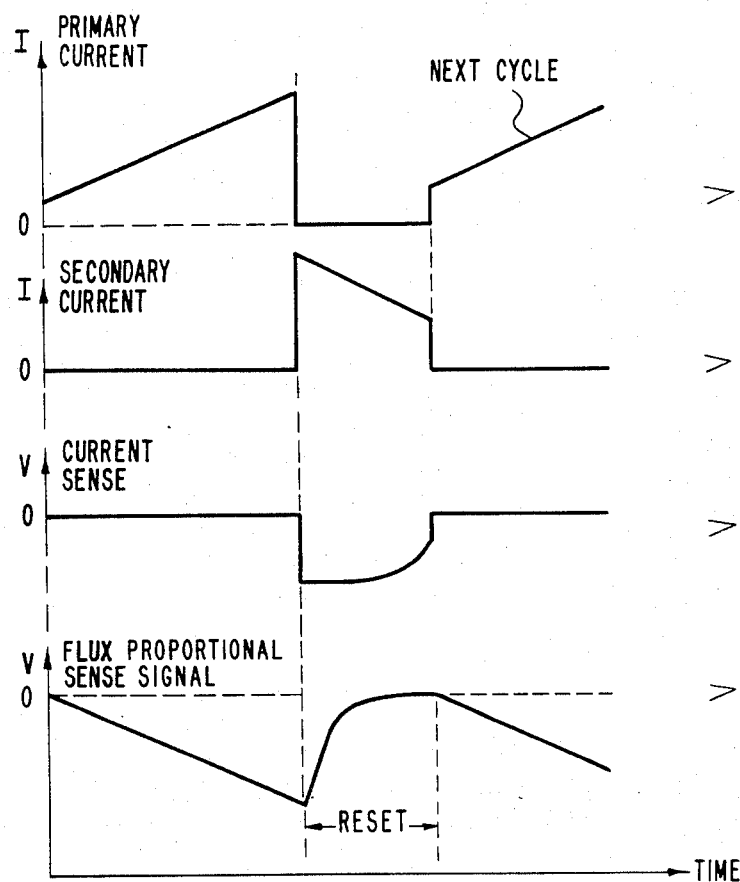
FIG. 2 is a timing diagram useful in explaining the operation of the circuit of FIG. 1.

With reference to FIGS. 1 and 2, there is shown a power supply 20 incorporating control circuitry of the invention. The supply 20 includes a transformer 22 having a primary winding 24 and a secondary winding 26 magnetically coupled via a core 28. The transformer 22 is a voltage step-up transformer having a turns ratio 1:N. Polarity of the winding 24 relative to that of the winding 26 is indicated by dots adjacent the windings. The primary winding 24 is serially connected between a source 30 of unregulated DC (direct current) voltage and a field-effect power transistor 32 (power FET), the source 30 and the transistor 32 being connected together by a ground 34. The transistor 32 is operated as an electronic switch for initiating and terminating the flow of current from the source 30 and, thereby, serves to generate pulses of current which are applied by the source 30 to the primary winding 24. An amplifier 36 drives the gate terminal of the transistor 32, the source and drain terminals thereof being connected, respectively, to ground and to the transformer 22. A capacitor 38 is coupled between ground and the input terminal of the primary winding 24 to provide a substantially constant voltage to the transformer 22 during the duration of an input current pulse. The current of the input pulse rises linearly with time due to the inductance of the primary winding 24.

The secondary winding 26 has a first terminal 41 and a second terminal 42, the first terminal 41 being connected via a diode 44 to one terminal of an energy storage capacitor 46. The opposite terminal of the capacitor 46 is connected to ground. A resistor 48 represents a load which is to be connected to output terminals of the supply 20; the resistor 48 is connected in parallel with the capacitor 46. Although the load here is represented as resistive (48) it typically may consist of a switched load such as a flashlamp.

The second terminal 42 is connected to a current sensing circuit 50 which senses the magnitude of current flowing through the secondary winding 26 in the direction of the diode 44. In particular, the circuit 50 is used, in a manner to be described, in sensing the decay of a current pulse which charges the capacitor 46. The circuit 50 comprises a diode 52, resistors 54 and 56, and a capacitor 58.

An integrator 60 connects between the first terminal 41 and ground for integrating the secondary voltage as a function of time for determining the amount of flux produced in the transformer 22 by the primary current in the primary winding 24. Since the primary current is proportional to volt-seconds across the primary terminals while the voltage out of the integrator 60 is also proportional to volt-seconds across the sensed winding, the output signal of the integrator 60 serves as a measure of primary current. The integrator 60 comprises a diode 62, a resistor 64, and a capacitor 66. The capacitor 66 is charged via the resistor 64 during an integration interval of time, the voltage across the capacitor 66 serving as the output signal of the integrator 60.

An integrator reset circuit 68 is coupled to the capacitor 66 for discharging the capacitor 66 after each integration interval and, thereby, resetting the integrator to insure accuracy in the integration process. The resetting is sometimes referred to as "caging the integrator." The reset circuit 68 comprises two diodes 70 and 72, five resistors 74, 76, 78, 80, and 82, and a comparator 84. The resistors 80 and 82 are serially connected between a positive source of voltage (which may be generated by conventional means, not shown) and ground to provide a reference voltage at the junction of the two resistors 80 and 82 for application to the positive input terminal of the amplifier 84. The negative input terminal of the amplifier 84 receives a logic signal on line 86 for activation of the reset circuit 68 as will be described hereinafter.

The three resistors 74, 76, and 78 are connected to the output terminal of the amplifier 84, with the resistors 74 being coupled to a junction of the diodes 70 and 72, while the resistors 76 and 78 are connected respectively to a source of negative voltage and to the positive input terminal of the amplifier 84. The three resistors provide a voltage which back biases the diodes 70 and 72 during an integration interval so as to permit the capacitor 66 to build up charge. During the discharge of the capacitor, the output voltage of the amplifier 84 rises to place the diodes 70 and 72 in a state of conduction. The diode 70 connects with the capacitor 66 to apply the discharge current thereto, and the diode 72 connects with ground so as to limit the maximum voltage applied to the capacitor 66.

The control circuitry of the supply 20 further includes a logic unit 88 which is responsive to the output signals of the current measuring circuit 50 and the integrator 60 to generate a logic signal on line 86 for operation of the reset circuit 68 and for operation of the transistor 32 via the amplifier 36. The logic unit 88 comprises a comparator 90 coupled to the output terminal of the current sensing circuit 50, a comparator 92 coupled to the output terminal of the integrator 60, and a NOR gate 94 which outputs the logic signal on line 86 in response to reception of output signals of the comparators 90 and 92. The NOR gate also receives an output signal from a comparator 96 which compares a sample of the output voltage of the supply 20 with a reference signal. The output voltage sample is obtained via two resistors 98 and 100 connected in series across the capacitor 46 and the load resistor 48. The reference signal for the comparator 96 is a source of positive voltage.

In accordance with the invention, the control circuitry of the supply 20 operates as follows. In response to a logic-1, or high voltage, signal on line 86, the transistor 32 is placed in a state of conduction so that primary current flows through the primary winding 24. While the transistor 32 comprises a power FET, a bipolar transistor or SCR (silicon control rectifier) may be utilized as the electronic switch for pulsing current through the primary winding 24. During the time that the transistor 32 is in a state of conduction, a relatively constant voltage provided by the capacitor 38 appears across the terminals of the primary winding 24, this resulting in a linear ramp primary current as is depicted in the first graph of the timing diagram in FIG. 2. The current in the primary winding 24 is to be terminated before a state of saturation is produced in the core 28.

In accordance with the invention, the termination of the pulse of primary current is accomplished by integrating the secondary voltage as a function of time by use of the integrator 60. During the rising primary current, a negative voltage appears at the secondary winding 26 which draws current from the capacitor 66 through the resistor 64 and the diode 62, and through the resistor 54 to ground. The output voltage of the secondary winding 26 is of constant value during the duration of the input pulse, as is the case with the voltage of the primary winding 24. Thus, the capacitor 66 charges at an essentially linear rate through the resistor 64 and the resistor 54 to provide an output voltage to the comparator 92 which rises at a linear rate, as is depicted in the fourth graph of FIG. 2. By way of example in the construction of the circuitry of FIG. 1, the resistor 54 is of relatively low resistance, typically 0.4 ohm. The resistor 64 has a value of 130 kilohm. The capacitor 66 has a value of 2200 picofarad. Thus, it is seen that the value of the resistor 54 is negligibly small as compared to that of the resistor 64 so that the charging rate of the capacitor 66 is determined essentially by the resistor 64 in combination with the capacitance of the capacitor 66. The voltage on the capacitor 66 is much less than the sensed voltage so that the charging rate of the capacitor 66 is controlled by resistor 64.

The voltage reference applied to the comparator 92 (shown in FIG. 1 is an exemplary −9.0 v) establishes the point on the fourth graph of FIG. 2 when the flux has reached the desired level for termination of the primary current. Accordingly, the comparator 92 provides a logic-1 signal which is outputted by the gate 94 as a logic-0 signal on line 86. The logic-0 signal on line 86 terminates conduction in the transistor 32, and thus terminates the primary current. In addition, the logic-0 signal on line 86 causes the amplifier 84 to output a positive voltage. The resistor 78 is connected as a positive feedback resistor to drive the output of the amplifier 84 to a full value of logic-1 signal. The logic-1 signal at the output of the amplifier 84 drives current via the resistor 74 and the diode 70 into the capacitor 66 to restore its initial value of voltage as is depicted in the reset portion of the fourth graph of FIG. 2. The coupling of the diode 72 from the junction of the resistor 74 and the diode 70 to ground clamps the positive voltage to a value equal to the forward voltage drop of the diode 72. This insures accurate repetition of the reset or caging stage in the operation of the integrator 60.

At the moment of the disruption of the primary current, the stored energy in the primary winding 24 of the transformer 22 is transferred to the secondary winding 26 wherein the stored energy is manifested as the secondary current depicted in the second graph of FIG. 2. The current flows via the diode 52 of the sensing circuit 50 through the secondary winding 26 and via the diode 44 to the storage capacitor 46. The capacitor 46 stores the energy provided by successive pulses of the secondary current. Such stored energy may be released at a steady rate to the load represented by the resistor 48, or at specific intervals of time in the event that the load be of a form which is operated intermittently. As the secondary current charges up the capacitor 46, the amplitude of the current decays as shown in the second graph of FIG. 2.

Prior to the complete decay of the secondary current, a new pulse of primary current is initiated. The turn-on time for the primary current is based on a sensing of the amplitude of the decaying secondary current. This is accomplished by the current sensing circuit 50. For relatively large values of secondary current, the output voltage of the circuit 50 is simply the forward voltage drop across the diode 52. As the secondary current decays, the output voltage drops below the forward voltage drop of the diode 52 and is equal to the voltage drop across the resistor 54. The series combination of the resistor 56 and the capacitor 58 connected in parallel with the resistor 54, aids in the suppression of any noise which might be associated with relatively low voltage drop across the resistor 54. The output voltage is thus taken across the capacitor 58 for application to the comparator 90. The foregoing description of the output voltage of the sensing circuit 50 is depicted in the third graph of FIG. 2.

By way of further details in the construction of a preferred embodiment of the invention, the transistor 32 is a DMOS form of power FET. The turns ratio is 1:5. The input unregulated voltage is approximately 28 volts and the output voltage at the capacitor 46 is typically 800 volts.

With respect to the voltage reference applied to the comparator 90, an exemplary value of −0.2 volts is shown in FIG. 1, this value may be altered to select the precise point in time when the secondary current is deemed to have decayed to a sufficiently low value for initiation of a new pulse of primary current. Typically, a decay to a value of approximately 25% of the maximum current has been found to designate a desired instant for initiation of a new pulse current. It is noted that the rate of decay of the secondary current is related to the amount of voltage already present on the capacitor 46. Thus, it is seen that both the duration and repetition frequency of current pulses from the secondary winding 26 to the capacitor 46 vary in accordance with input voltage and load voltage as the capacitor charges.

When the voltage across the capacitor 46 has reached its desired value, the comparator 96 produces a logic-1 signal which is coupled by the gate 94 to produce a logic-0 signal on line 86. Thus, the transistor 32 is maintained in a state of nonconduction until the voltage across the capacitor 46 is reduced. The value of the reference voltage applied to the comparator 96 or, alternatively, the values of the resistors 98 and 100 may be altered to provide for a different trigger level of the comparator 96, thereby to set the power supply 20 to a different value of maximum voltage output.

A further feature in the control circuitry is the use of hysteresis in the comparator 92. The magnitude of the hysteresis employed is 4.5 volts. Thereby, as the voltage across the capacitor 66 drops rapidly during the resetting of the integrator 60, the output logic state of the comparator 92 does not change prematurely. Thereby, the initiation of the following pulse of primary current is retarded until an output signal of the current comparator 90. By way of example, in the operation of the reset circuit 68, the resistor 74 may have a value of 1800 ohms for a reset time of approximately 2 microseconds. During this reset time interval, there is sufficient time for the comparator 90 to take over control of the logic signal on line 86 as the voltage of the capacitor 66 passes through the hysteresis interval of the comparator 92. Thereby, smooth operation of the supply 20 is assured.

The foregoing description has provided for control circuitry wherein the pulsing of primary current is controlled by observation of the secondary current. Thereby, no current sensing equipment is provided in the primary circuit of the transformer 22. As a result, more stable and versatile operation of the supply 20 is obtained.

It is to be understood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a transformer-coupled flyback switching regulator power supply having an input circuit for connection to a source of electric power and an output circuit including a storage capacitor for delivery of electric power to a load, there being a transformer having a primary winding connected to the input circuit and a secondary winding connected through a diode network to teh storage capacitor, adapted for coupling energy from the input circuit to the storage capacitor in the form of pulses of current induced in the secondary winding, a power-flow control circuit comprising:
  Pulsing means disposed in said input circuit for initiating and terminating input pulses of electric power from said source to said primary winding;
  integrating means disposed in said output circuit for sensing an electrical parameter proportional to magnetic flux developed in a core of said transformer in response to said input pulses;
  current sensing means disposed in said output circuit for sensing current flow in said secondary winding; and
  logic means having inputs connected to said integrating means and current sensing means with an output connected to the pulsing means, adapted to provide an output signal to initiate a pulse of energy through the primary winding when the current sensing means detects a current through the secondary winding below a given threshold, with the logic means being further adapted to provide an output signal to said pulsing means to terminate said pulse when the integrating means detects that said electrical parameter exceeds a given threshold whereby said storage capacitor is charged to a predetermined magnitude through a series of pulses without saturating the transformer.

2. In a power supply, a control circuit according to claim 1 further comprising means responsive to the charge stored in said storage capacitor for locking out said logic means to prevent activation of said pulsing means when said charge reaches said predetermined magnitude.

3. In a power supply, a control circuit according to claim 1 wherein said pulsing means is an electronic switch coupled in series between said primary winding and said source.

4. In a power supply, a control circuit according to claim 1 wherein said integrating means comprises an integrator connecting with said secondary winding for integrating a voltage thereof to provide an integrated voltage which is proportional to both said flux and a value of current in said primary winding corresponding to said flux.

5. In a power supply, a control circuit according to claim 4 wherein said flux proportional sensing means further comprises means responsive to an output signal of said logic means for resetting said integrator after termination of an input pulse.

6. In a power supply, a control circuit according to claim 5 wherein said integrator includes a capacitor which is charged during an integration by said integrator, and wherein said resetting discharges said capacitor.

7. In a transformer-coupled flyfack switching regulator power supply having an input circuit for connection to a source of electric power and an output circuit including a storage capacitor for delivery of electric power to a load, there being a transformer having a primary winding connected to the input circuit and a secondary winding connected through a diode network to the storage capacitor, adapted for coupling energy from the input circuit to the storage capacitor in the form of pulses of current induced in the secondary winding, a power-flow control circuit comprising:
  pulsing means disposed in said input circuit for initiating and terminating direct current from said source through said primary winding;
  integrating means connected to said secondary winding for sensing an electrical parameter proportional to magnetic flux developed in a core of said transformer in response to said current flow through the primary winding;
  current sensing means disposed in said output circuit for sensing current flow in said secondary winding;
  logic means coupling said integrating means and said current sensing means to said pulsing means, said logic means including a flux comparator generating a first output signal when the magnitude of said flux proportional electrical parameter exceeds the magnitude of a reference signal, a current comparator generating a second output signal when the magnitude of the signal of said current sensing means drops below the magnitude of a reference signal, and means for coupling the output signals of said flux comparator and said current comparator to control said pulsing means, said means being adapted to cause the pulsing means to initiate flow of current through the primary winding in response to said second output signal and to terminate the current through the primary winding in response to said first signal whereby the storage capacitor is charged to a predetermined magnitude through a series of pulses induced in the secondary winding without saturating the transformer.

8. In a power supply according to claim 7, wherein said integrating means comprises an integrator connecting with said secondary winding for integrating a voltage thereof to provide an integrated voltage which is proportional to both said flux and a value of current in said primary winding corresponding to said flux, said integrating means further comprising means reponsive to an output signal of said logic means for resetting said integrator after termination of an input pulse to said primary winding.

9. In a power supply, a control circuit according to claim 8 wherein said integrator includes a capacitor which is charged during signal integration by said integrator, and wherein said resetting discharges said capacitor, said resetting means including a diode circuit which opens for allowing said capacitor to charge, and which closes to allow a discharging current to flow into said capacitor; and wherein said control circuit further comprising:

means responsive to the charge stored in said storage capacitor for locking out said logic means to prevent activation of said pulsing means when said charge reaches said predetermined magnitude.

* * * * *